(12) United States Patent
Walsh

(10) Patent No.: US 6,246,766 B1
(45) Date of Patent: Jun. 12, 2001

(54) PORTABLE TELEPHONE MOUNTING BASE

(75) Inventor: Sean F. Walsh, Boulder, CO (US)

(73) Assignee: Energymanager.com, Inc., Denver, CO (US)

( * ) Notice: Subject to any disclaimer, the term of this patent is extended or adjusted under 35 U.S.C. 154(b) by 0 days.

(21) Appl. No.: 09/172,450

(22) Filed: Oct. 14, 1998

(51) Int. Cl.⁷ ................................................. H04M 1/00
(52) U.S. Cl. ........................... 379/455; 379/454; 379/426
(58) Field of Search .................................... 379/455, 426, 379/454, 446; 248/312, 311, 230

(56) References Cited

U.S. PATENT DOCUMENTS

| | | | |
|---|---|---|---|
| 5,529,271 | * 6/1996 | Dunchock | 248/205.2 |
| 5,745,565 | * 4/1998 | Wakefield | 379/446 |
| 6,058,185 | * 5/2000 | Alanara | 379/446 |

OTHER PUBLICATIONS

"Stylin' Concepts" Catalog #7 (1998), p.25.*

* cited by examiner

Primary Examiner—Jack Chiang
Assistant Examiner—Hector Agdeppa
(74) Attorney, Agent, or Firm—James R. Young; Chrisman Bynum & Johnson

(57) ABSTRACT

A portable telephone or cell phone holder fits in a conventional cup holder of an automobile or other vehicle. It has an arcuate sidewall that is less than 360° and is resiliently deformable to be squeezed sown to less than the diameter of the cup holder and then, when released, to grip the inside surface of the cup holder. A tongue extends upwardly and radially inwardly from the sidewall to a distal end to provide a support telephone platform and has a concave slanted surface to accommodate and center a telephone belt clip.

13 Claims, 8 Drawing Sheets

PORTABLE TELEPHONE MOUNTING BASE

BACKGROUND OF THE INVENTION

1. Field of the Invention

The present invention is related generally to a portable telephone holder and more specifically to a portable telephone holder with a mounting base that is configured and sized to fit into typical conventional cup holders in automobiles and other vehicles and with an elongated shelf for supporting a portable telephone.

2. Description of the Prior Art

Portable, or cellular, telephones operate by using networks of short range transmitters located in overlapping cells throughout a geographical region. Telephone calling signals to and from the portable telephone are switched automatically from one transmitter to another as the telephone travels among adjoining cells. Such cellular systems have made use of portable telephones in automobiles and other vehicles very common. However, stowing such portable telephones in vehicles is somewhat of a problem, because portable telephones should be easily accessible to drivers, yet secure enough to keep them from tumbling around in vehicles during starts, stops, and other vehicle motions. Some vehicle manufacturers build portable telephone docking apparatus into their interior accouterments, such as in consoles or compartments in the seats, but most vehicles do not have such facilities. There are myriad telephone mounting devices available, but most of them require some permanent or semi-permanent attachment to the floorboard, dashboard, or other structural component of the vehicle. Most drivers do not have either the skills required or the inclination to make such attachments, thus requiring the services of skilled technicians to install such telephone mounting equipment, and once installed, they cannot be moved conveniently from one vehicle to another.

Many portable telephones are also equipped with flexible clips that can be hooked onto a belt, a pocket, or other location, to free up the user's hands for other purposes. However, hooking the portable telephone onto a belt is most practical when the person is standing or walking, not while the user is seated and particularly not while the user is also operating a vehicle.

SUMMARY OF THE INVENTION

Accordingly, it is an object of this invention to provide a universal mounting or docking device for holding a portable telephone in an automobile or other vehicle in a secure manner that can be installed without special skills or tools and that can be used easily in a wide variety of vehicles without significant distraction.

It is another object of the present invention to provide a portable telephone mounting base for vehicles that facilitates the user picking up the telephone for use and then replacing it easily into a secure, stowed position.

It is another object of the present invention to provide a portable telephone mounting base for vehicles that will accommodate a variety of telephones with different sizes and shapes.

It is another object of the present invention to provide a portable telephone mounting base for vehicles that supports the portable telephone firmly enough to allow the user to dial the telephone while it is held in place.

It is another object of the present invention to provide a portable telephone mounting base for vehicles that is durable, simple in structure, and inexpensive to manufacture.

To achieve the foregoing and other objects and in accordance with the purposes of the present invention as embodied and broadly described therein, the apparatus of the present invention includes a base that is sized and shaped to fit securely in a conventional cup holder in an automobile or other vehicle and with an elongated shelf supported above the base for holding a conventional portable telephone to facilitate transport and use thereof. The shelf is configured to receive and retain a conventional portable telephone equipped with a flexible belt clip for carrying the telephone or for use with other fasteners, such as hook-and-loop pile strips, straps, or the like. In a preferred embodiment, the mounting base has a hollow, cylindrical, or semi-cylindrical body made of a resilient, flexible material, which allows the sidewall of the body to be deformed radially inwardly to facilitate insertion of the body into a cup holder. The elongated shelf can be in the form of a tongue extending upwardly and radially inwardly from the sidewall of the body. The user can mount the portable telephone on the shelf by sliding a flexible belt clip on a telephone over the upper edge of the tongue and downward until a surface on the proximal end of the belt clip contacts said upper edge of the shelf, preventing further downward movement. A concave surface on the underside of the shelf helps to guide the belt clip toward the middle of the shelf. The shelf may also have two parallel ribs on the underside of the shelf to inhibit lateral movement of the mounting clip, thus also the telephone, on the shelf, thereby providing lateral stability for the portable telephone. Alternate embodiments of the base, or attachments of the shelf to the base, and of guiding and stabilizing features on the shelf can also be used to achieve the objects in accordance with this invention.

BRIEF DESCRIPTION OF THE DRAWINGS

The accompanying drawings, which are incorporated in and forma apart of the specifications, illustrate the preferred embodiments of the present invention and, together with the descriptions serve to explain the principles of the invention. In the Drawings:

FIG. 5 is a rear elevation view of the portable telephone holder of the present invention;

DETAILED DESCRIPTION OF THE PREFERRED EMBODIMENTS

Figure 1:
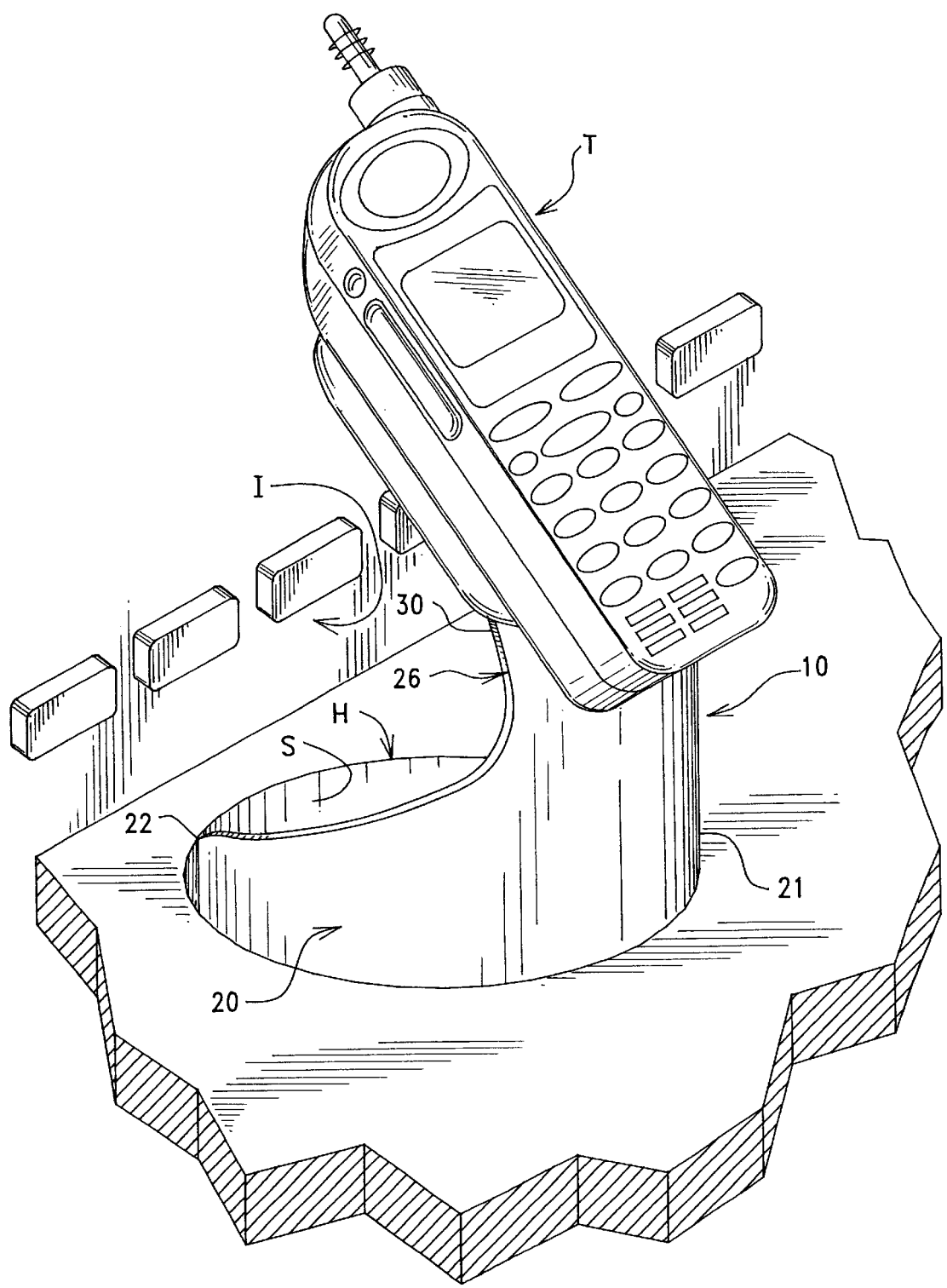
FIG. 1 is an isometric view of the portable telephone holder configured according to the present invention positioned in a typical automobile cup holder and with a portable telephone mounted on and supported by the holder.
Figure 2:
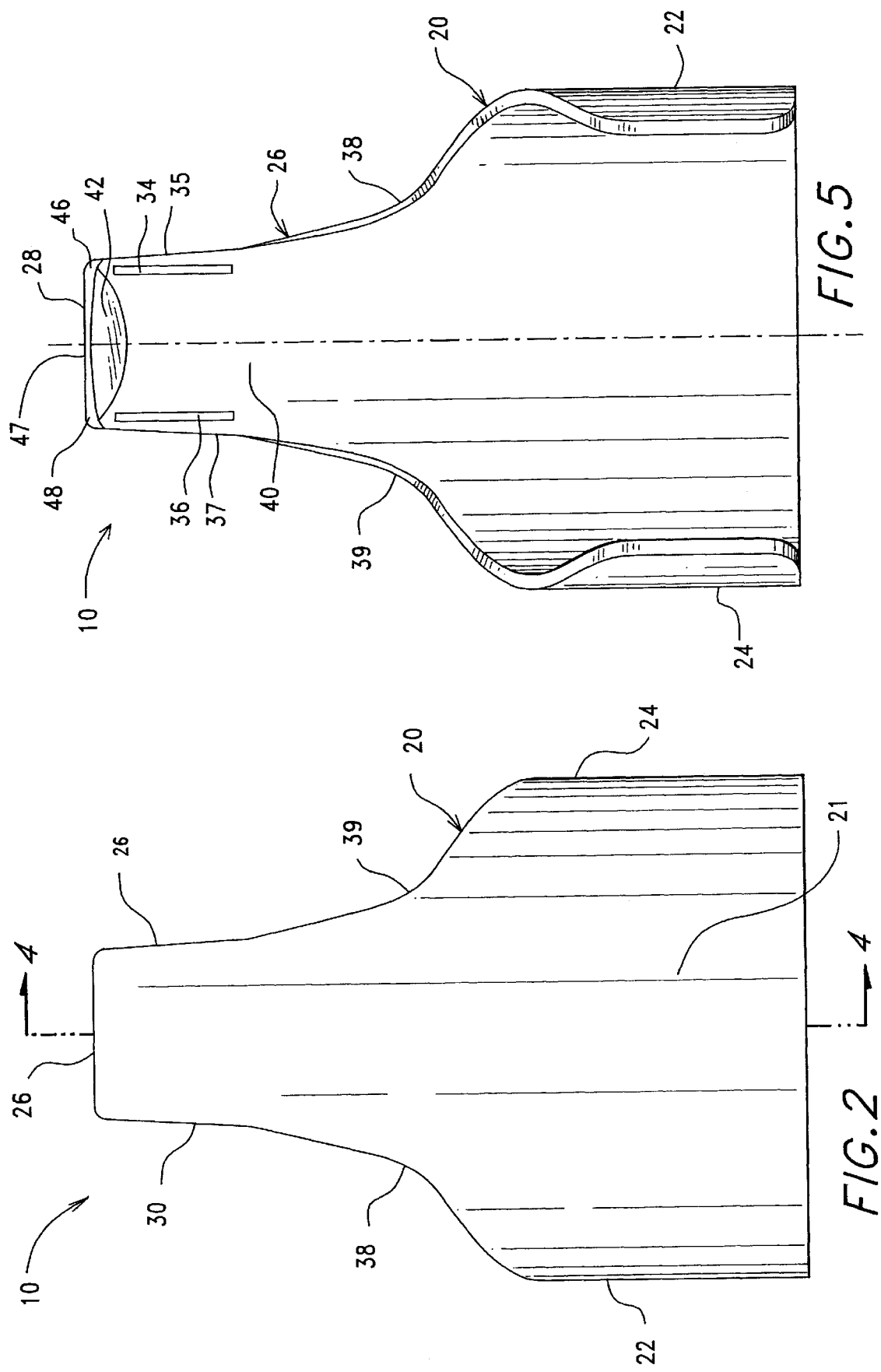
FIG. 2 is a front elevation view of the portable telephone holder of this invention.
Figure 4:
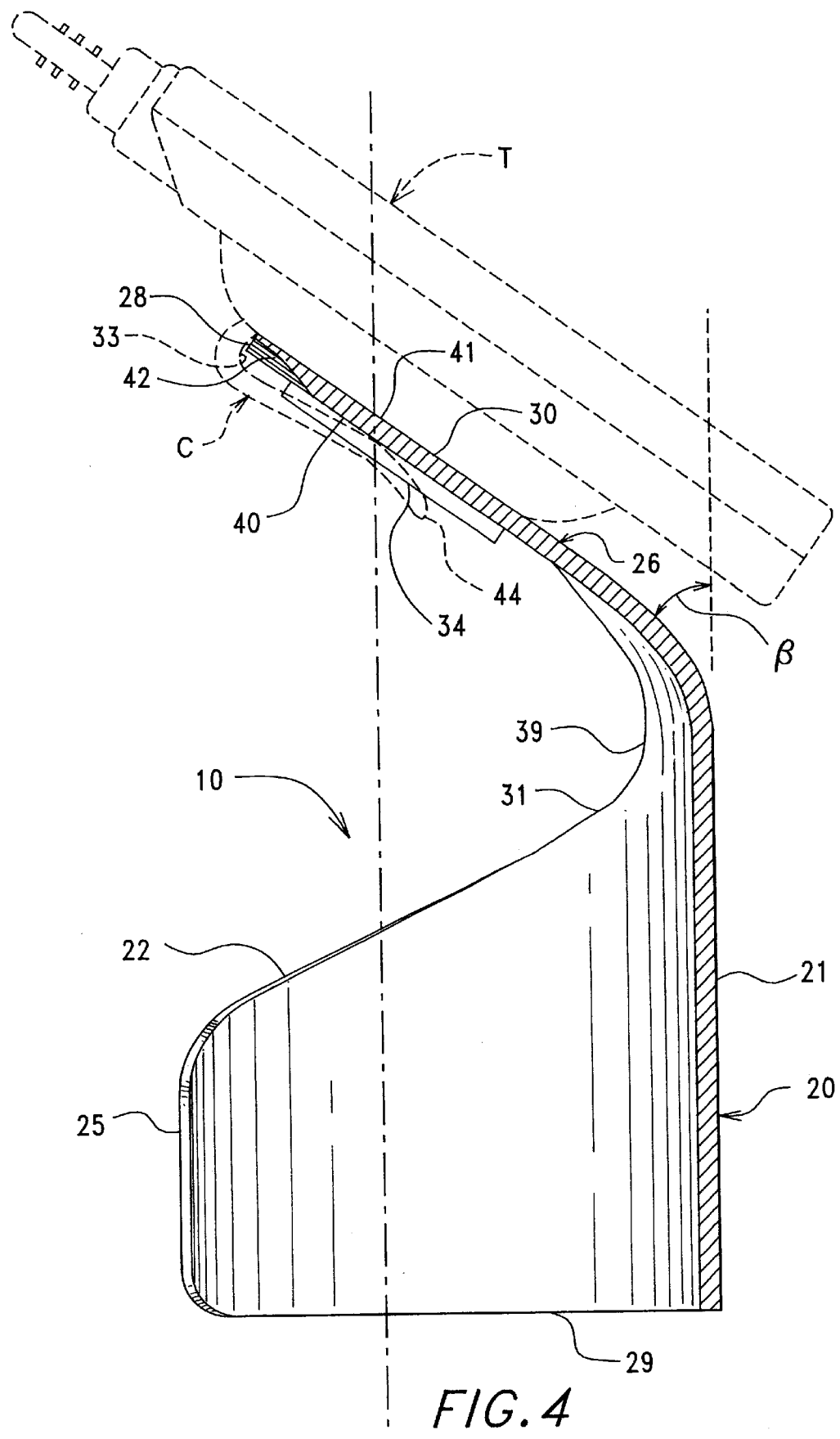
FIG. 4 is a cross-sectional view of the portable telephone holder of this invention taken along line 4—4 of FIG. 2 and with a portable telephone shown in phantom lines mounted on the holder.

The portable telephone holder 10 of the present invention is illustrated in FIG. 1 positioned in a typical conventional cup holder H in the interior I of an automobile or other vehicle and supporting a portable telephone T in stowed position. Cup holders H are common accouterments in many vehicles, and, usually, at least one of such cup holders H is placed in such vehicles in a location that is convenient and accessible to the driver. Such cup holders H are available in a variety of styles, shapes, and sizes, but they are all designed to hold cups containing liquids in a stable manner. Most cup holders H, therefore, have some kind of well or aperture at least partially surrounded by a wall or ring with an interior surface S that is sized and shaped to contact and support the exterior peripheral surface of a cup (not shown) that may be inserted into the well or aperture. In some cup holders H, the interior surface S is rigid, while in other cup holders H the interior surface has one or more flexible elements (not shown) for contacting and supporting the peripheral surfaces of a cup. Further, some cup holders H also have bottom platforms or floor surfaces (not shown) to contact and support a bottom of a cup, while other cup holders H have no such bottom platforms or floor surfaces. Therefore, the base 20 of the portable telephone holder 10 of this invention is sized and shaped to have an exterior peripheral surface 21 similar to at least a portion of a peripheral surface of a cup in order to obtain the benefit of the interior surface S of the cup holder to support a portable telephone T in a place conveniently accessible to a driver of a vehicle that is equipped with a cup holder H. Accordingly, the base 10 of the portable telephone holder 10 has either a cylindrical peripheral surface 21 or a slightly frusto-conical peripheral surface 21 to engage the interior surface S of the cup holder H. While the cylindrical surface can have a circular cross-section within the scope of this invention, as will be described in more detail below, a semi-circular cross-section has several advantages, as will also be described in more detail below. A rigid tongue 26 extends upwardly from the base 20 and forms an elongated, slanted shelf 30 to engage and support the portable telephone T on the portable telephone holder 10, preferably taking advantage of a belt clip C (not shown in FIG. 1), which is a conventional feature on most portable telephones T or on leather cases (not shown) that are available for most portable telephones T. The belt clip C, as shown in FIG. 4, can be used to secure the telephone T to the shelf 30 of tongue 26 of the portable telephone holder 10. Other attachment structures, such as hook and loop pile strips (Velcro™), straps, bands, clips, or other fasteners can also be used to attach and secure the portable telephone T to the tongue 26.

To use the portable telephone T, the driver can pull the telephone T off the shelf 30 of tongue 26, leaving the portable telephone holder 10 in the cup holder H. However, in many cases, it may be more convenient for the driver to grab the portable telephone holder 10 along with the portable telephone T and remove the entire assembly of the telephone T attached to the holder 10 from the cup holder H in order to use the telephone T. It is then as easy to re-stow the telephone T after use in the cup holder H as it is to place a cup in the cup holder H by simply replacing the holder 10 into the cup holder H with the telephone T still positioned on the shelf 30 and attached to the tongue 26. On the other hand, for portable telephones T equipped with speakers and microphones for hands-free use while driving, the holder 10 supports the telephone T in a secure enough manner in the cup holder H to allow the driver to push button dial the telephone T in its stowed position. Alternatively, the driver could remove the holder 10 along with the telephone T from the cup holder H, as described above, in order to hold the telephone T in a more visible position while dialing, then replace them to the cup holder H stowed position for his or her telephone conversation via the speaker and microphone. Therefore, the portable telephone holder 10 of this invention provides drivers with the flexibility to use a portable telephone T in an automobile or other vehicle in a manner that they deem appropriate and convenient. When removing the portable telephone T from the vehicle, it can be detached from the tongue 26, leaving the portable telephone holder 10 stowed in the cup holder H for later use. Alternatively, the driver can also remove the portable telephone holder 10 from the cup holder H in the vehicle, so the portable telephone holder 10 can be used in another vehicle or in the driver's office or home to support the portable telephone T in a useful position on a desk or table.

Figure 3:
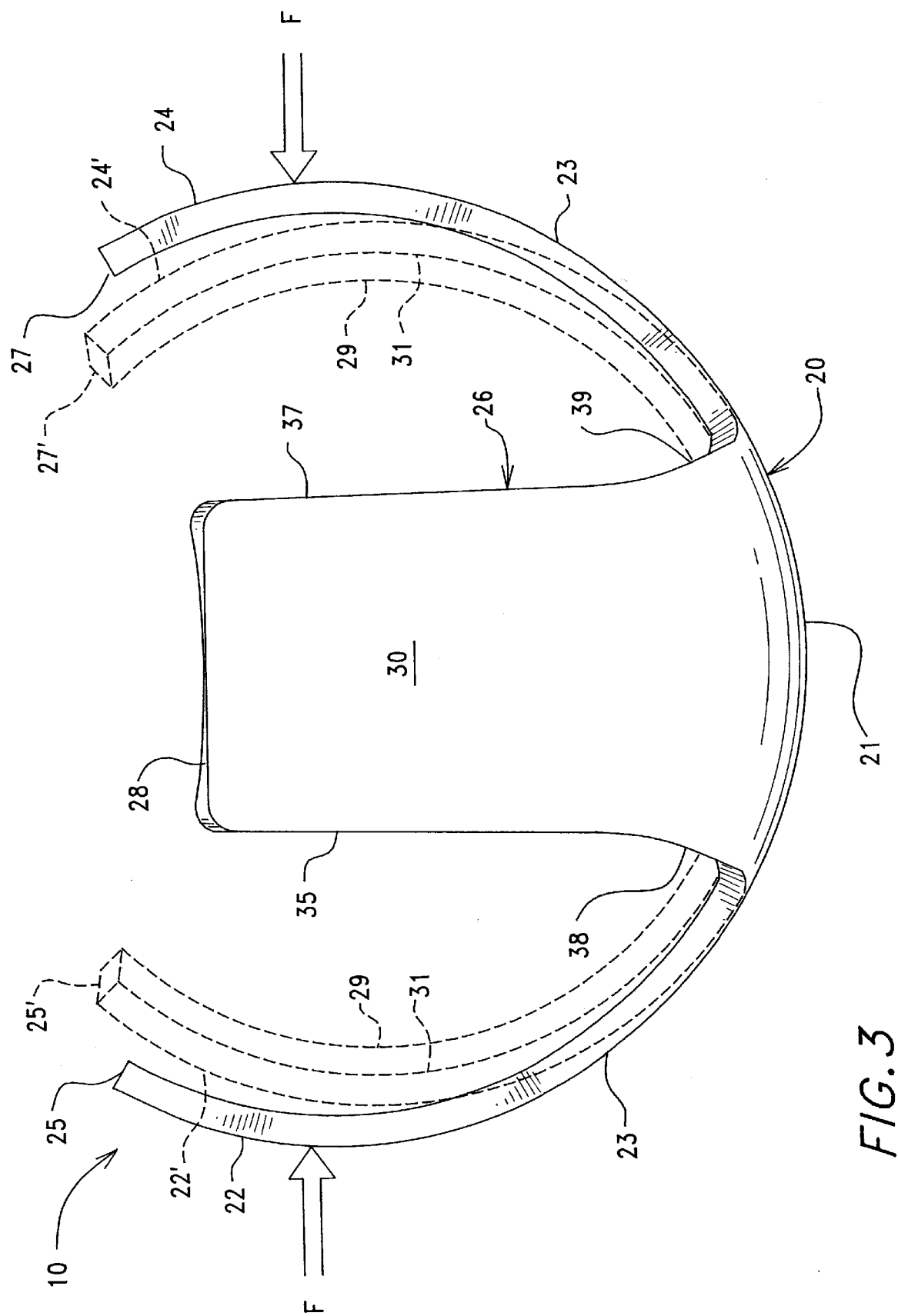
FIG. 3 is a top plan view of the portable telephone holder of this invention with hidden lateral support ribs and a lower edge of the inclined surface shown in phantom lines.

In the preferred embodiment of this invention shown in FIGS. 1–6, the base 20 is preferably semi-cylindrical in shape, open at its top and bottom, and with an arcuate side wall 23 that terminates at opposing ends 25, 27. The sidewall 23 is preferably formed with a resiliently yieldable, semi-rigid material that deforms to a smaller diameter under opposed, inwardly directed forces F—F applied to opposite wings 22, 24 of sidewall 23, as indicated by phantom lines 22', 24', 25', 27' in FIG. 3, but which has a memory so that it returns to its original shape 22, 24, 25, 27 when the deforming forces F—F are removed. The diameter of the base 20 may be, but is not necessarily, slightly larger than a diameter of a standard-sized cup, so that the driver (not shown) can apply deforming forces F—F to deform the wings 22, 24 toward each other, as shown at 22', 24' of FIG. 3, before inserting the base 20 into a cup holder H, as shown in FIG. 1. Because the tongue 26 in the region of shoulders 38, 39 is rigid and resists deformation, the forces F—F cause relatively more radially inward deformation at the bottom edge 29 of the sidewall 23 than at the top edge 31, as shown in FIG. 3, which imparts a frusto-conical shape to the base 20 to facilitate insertion of the base 20 into the cup holder H in FIG. 1. Then, when the driver releases the deforming forces F—F, the memory in the resilient wings 22, 24 tends to move the wings 22, 24 back outwardly into contact with the interior surface S of the cup holder H. If the diameter of the opening or well of the cup holder H is less than the normal, nondeformed diameter of the base 20, the material memory of the base 20 will bias the wings 22, 24 and surface 21 of the base 20 forcibly against the internal surface S of the cup holder H to increase frictional engagement, thus stability, of the portable telephone holder 10 in the cup holder H. While inserting the base into the cup holder with wings 22, 24 pressed inwardly, the base can be rotated about its vertical axis until it is in a preferred orientation in relation to the user, and then the forces F—F on the wings 22, 24 released.

As best shown in FIG. 4, the front surface 21 of the semi-cylindrical side wall 23 of base 20 is generally vertical at the bottom, and an elongated, rigid tongue 26 extends upwardly and radially inwardly from shoulders 38, 39 at the top of side wall 23 to form an elongated, inclined shelf 30 with a support surface 41 on the tongue 26 for supporting the portable telephone T, which is shown in phantom lines in FIG. 4. The elongated tongue 26 is generally rectangular in shape, with rounded corners, and forms an angle β to vertical so that the telephone T on surface 41 of shelf 30 is generally visible and accessible to the driver (not shown) and further so that a substantial component of forces applied to push-button dial the telephone T are directed downwardly onto the portable telephone holder 10. The angle β is preferably, but not necessarily, in a range between about 30° and 60°.

With continuing reference primarily to FIG. 4, the portable telephone T is preferably mounted on the tongue 26 and secured in that position with a conventional belt clip C, which is a common feature of most portable telephones T or of leather cases that are commonly provided with, or otherwise commercially available for, such portable telephones. For mounting, the telephone T is positioned adjacent top surface 41 of elongated shelf 30 such that the tip of belt clip C is adjacent the distal end 28 of tongue 26. As the telephone T is moved downwardly on upper surface 41 of shelf 30, the belt clip C slides under the distal end 28 and then along the underside 40 of shelf 30 until the vertex 33 of the belt clip C approaches and preferably contacts the distal end 28, thereby prohibiting further downward movement of the belt clip C and, hence, the telephone T on the shelf 30.

To facilitate this mounting movement, a beveled surface 42 is provided adjacent distal end 28 of tongue 26. This beveled surface 42 provides a thinner edge profile at distal end 28, which facilitates the leading end 44 of the belt clip C getting started to slide under the shelf 30, and the beveled surface helps to spread the belt clip C from the body of telephone T as the telephone T and belt clip C are moved downwardly onto the shelf 30.

The shelf 30 is preferably wider than the belt clip C, and the beveled surface 42 adjacent the distal end 28 of tongue 26 is also preferably concave, as best seen in FIG. 5 in combination with FIG. 4, so that the distal end 28 is thicker at the outer edges 46, 48 than in the middle 47. This concave profile tends to guide the belt clip C toward the middle of the width of the shelf 30 as the telephone T is being mounted and to retain it there, so that the telephone T does not slip off a side of the shelf 30 during use.

As best seen in FIGS. 4 and 5, retention of the telephone T on the shelf 30 can also be enhanced by two generally parallel guide ridges 34, 36 that extend from the underside 40 of shelf along respective opposite edges 35, 37 near the distal end 28. These ridges 34, 36 are spaced a distance apart from each other sufficient to accommodate the width of the belt clip C between them when the telephone T is mounted on the shelf 30 of tongue 26. Therefore, these ridges 34, 36 resist lateral movement of the belt clip C, thus also of telephone T, off the shelf 30. These two parallel ridges 34, 36, which can be molded in a unitary manner on the underside 40 of the shelf 30, also tend to prevent the clip C from pivoting about a point at which the vertex 33 of the clip C contacts distal end 28 of tongue 26, thereby limiting pivotal movement of the telephone T on the shelf 30 as well.

Figure 6:
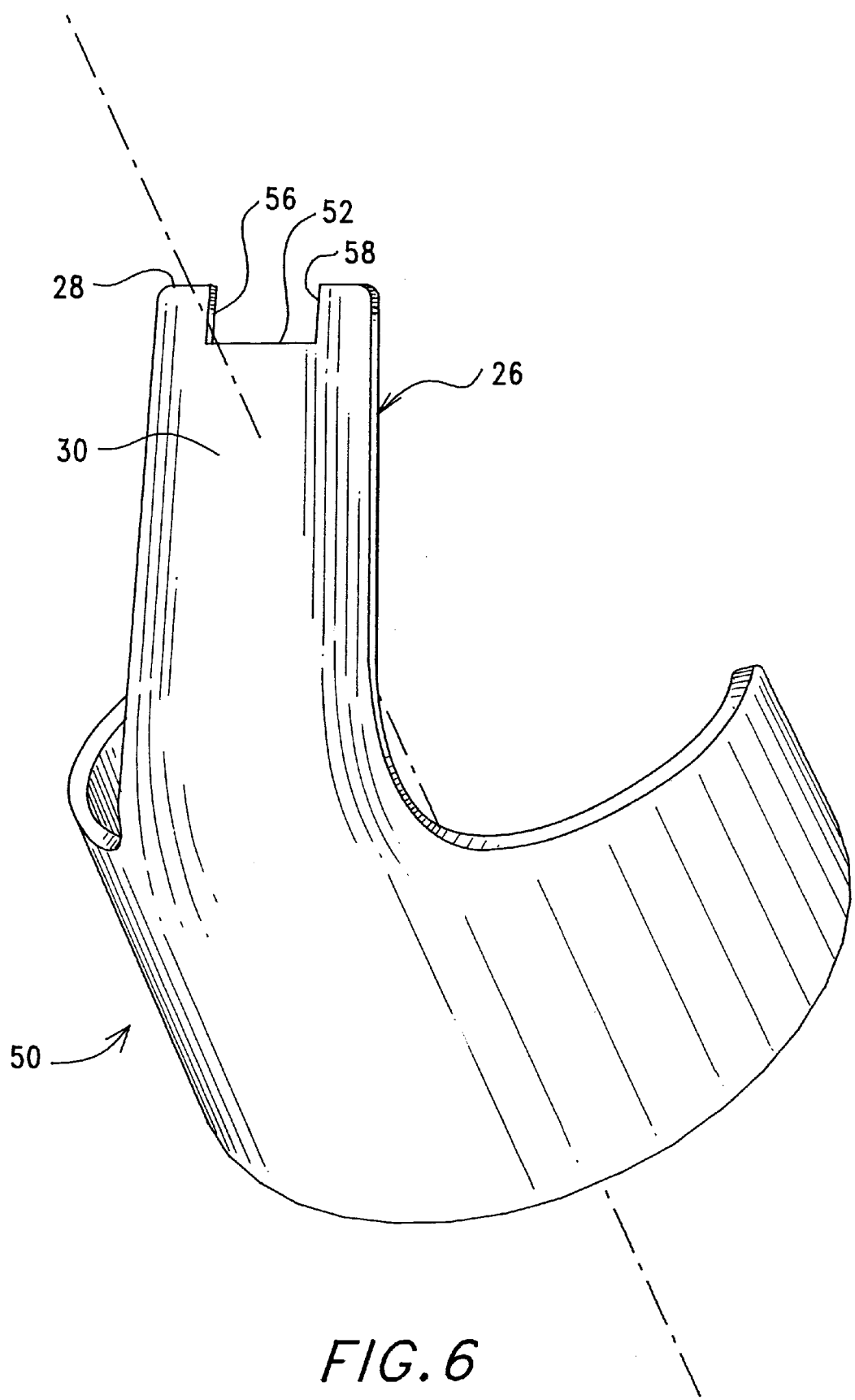
FIG. 6 is an isometric view of an alternate embodiment of the portable telephone holder of the present invention in which a notch is used to stabilize a portable telephone (not shown) when mounted on the holder.

Another embodiment 50 of the portable telephone holder of this invention is shown in FIG. 6 with a notch 52 molded into the distal end 28 of tongue 26 into which the belt clip C of the portable telephone T can be inserted. Vertical surfaces 56, 58 of the notch 52 provide lateral support for the belt clip C and prohibits the clip C, thus also the telephone T (not shown in FIG. 6) from slipping laterally off the shelf 30 of tongue 26. Therefore, this notch 52, which can be used alone or with the beveled surface 42 and/or ridges 34, 36 of FIGS. 4 and 5, can also increase the stability of telephone T when mounted on the portable telephone holder 10.

Figure 7:
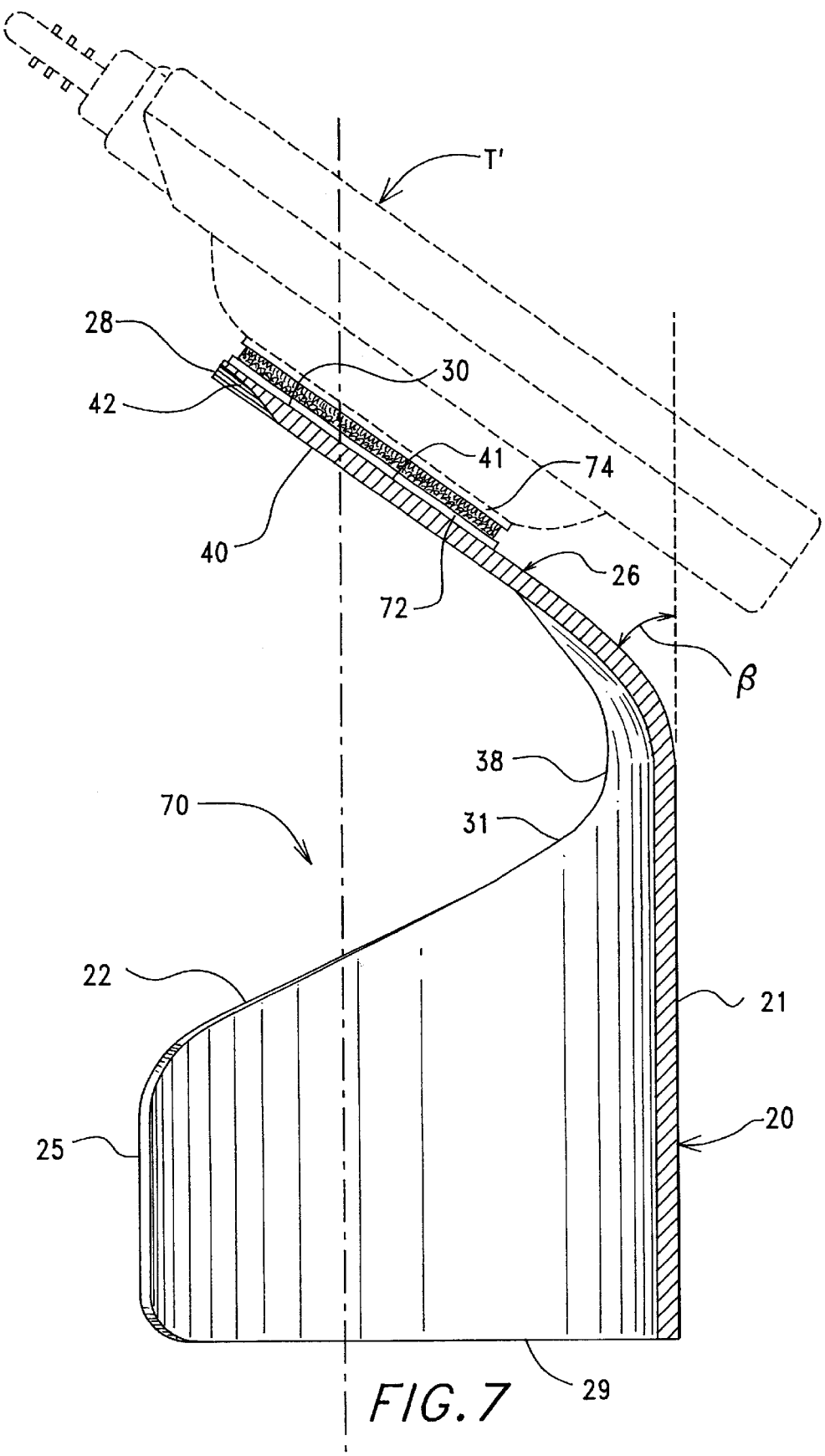
FIG. 7 is a cross-sectional view of an alternate embodiment of the portable telephone holder of the present invention, taken along line 4—4 of FIG. 2, with a portable telephone shown in phantom lines mounted on the holder using a hook-and-loop fastener, such as Velcro™.

The portable telephone holder embodiment 70 shown in FIG. 7 is similar to the preferred embodiment 10 shown in FIGS. 1–5, except that embodiment 70 utilizes hook-and-loop pile strips, such as Velcro™, to attach a portable telephone T', which does not feature an attached belt clip, to the surface 41 of the elongated shelf 30. As shown in FIG. 7, a strip 72 of the hook-and-loop fastening system is attached with adhesive backing to surface 41 of tongue 26 and an opposing strip 74 is attached to the underside of telephone T', also with adhesive backing.

The telephone T' is positioned above surface 41 of tongue 26 with opposing hook and loop system strips 72, 74 adjacent each other, and which engage each other when pressed together, thereby attaching telephone T' to the portable telephone holder 70.

Figure 8:
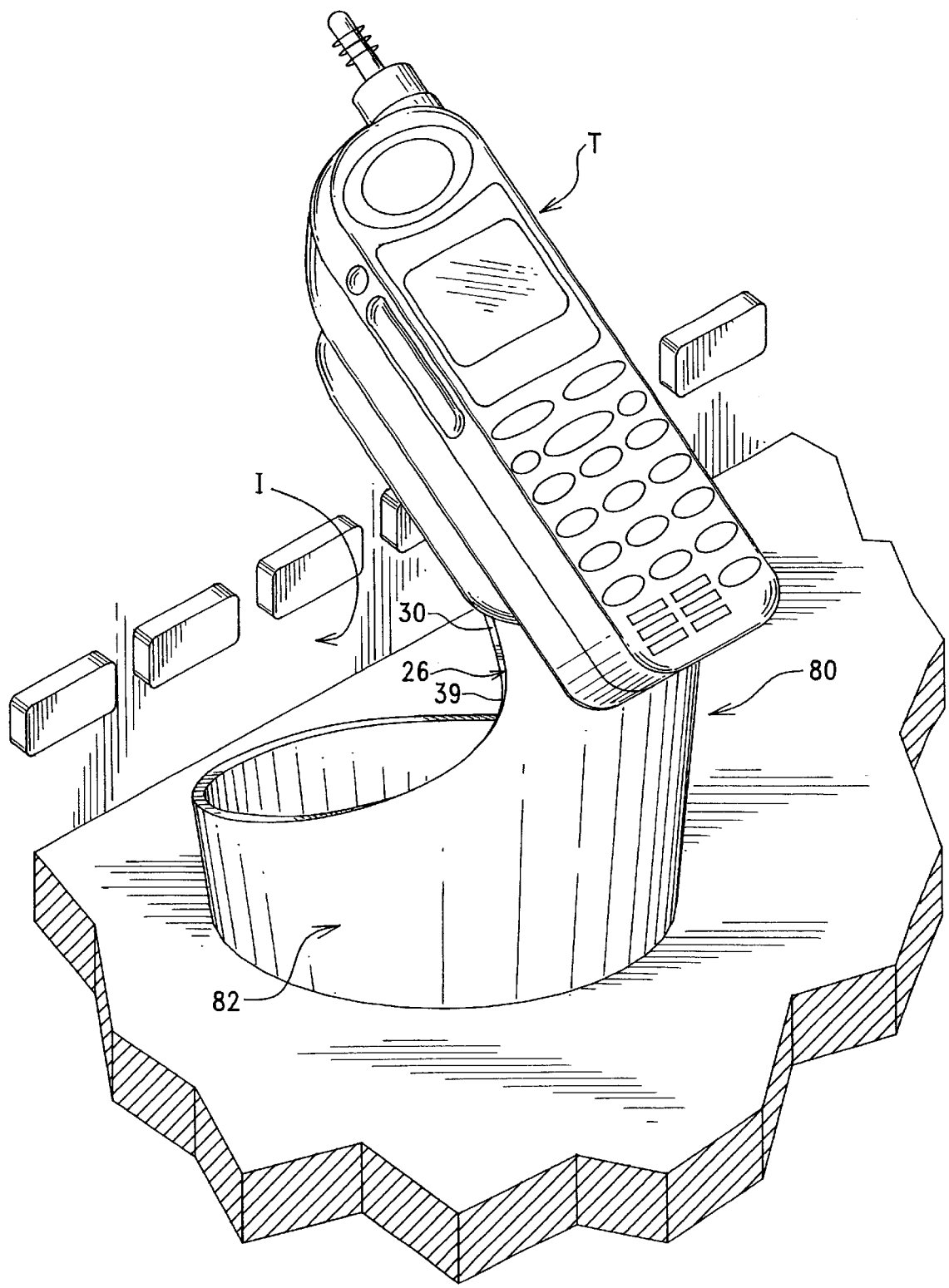
FIG. 8 is an isometric view of an alternate embodiment of the portable telephone of the present invention positioned in a typical automobile's cup holder with a portable telephone mounted on and supported by the holder, in which the base of the telephone holder is in the form of a hollow, conical frustum.

Another embodiment 80 of the portable telephone holder of this invention, as shown in FIG. 8, has a slightly frusto-conical body 82 whose surface will, when inserted into the cup holder H, at least partially engage the interior surface S of cup holder H. Similar to embodiment shown in FIGS. 1–5, mounting base 80 also has an elongated, rigid tongue 26 which extends upward and radially inwardly from shoulder 38, 39 to form an elongated, inclined shelf 30 with a top support surface 41 on the tongue 26 for supporting the portable telephone T.

Figure 9:
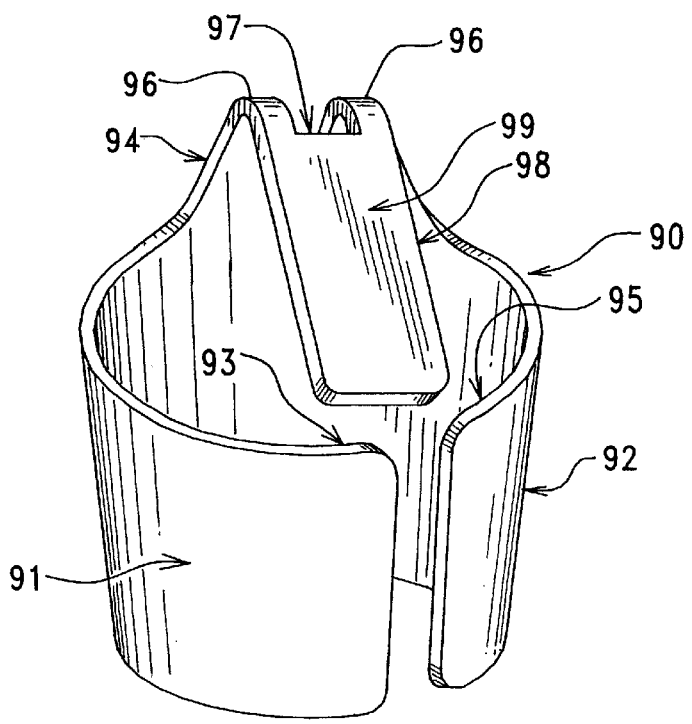
FIG. 9 is an isometric view of an alternate embodiment of the portable telephone holder of the present invention in which the shelf for supporting the portable telephone extends downwardly from an upward extension of the rear of the base.

Yet another embodiment 90 of the portable telephone holder of this invention, as shown in FIG. 9, has a base 92 which can either have a cylindrical peripheral surface 91 or a slightly frusto-conical peripheral surface 91 which engages the interior surface S of cup holder H (not shown in FIG. 9, but shown in FIG. 1). Similar to the preferred embodiment 10 of the portable telephone holder of the present invention shown in FIGS. 1–5, the base 92 of embodiment 90 also terminates at opposing wings 93, 95 thereby enabling the same procedure to be used for inserting the base 92 into cup holder H. From the base 92, a stem region 94 extends upward to a crest region 96 and then angles downward forming a shelf 98 for supporting the portable telephone T (not shown in FIG. 9, but shown in FIG. 1). A notch 97 at the center of the crest 96 is bounded on either side by sufficient material to provide a rigid, cantilever support for the shelf 98. The notch 97 is of sufficient width to allow the belt clip C of the portable telephone T (not shown in FIG. 9) to pass through said notch 97 and thereby stabilize telephone T on surface 99 of the shelf 98, again in the same manner demonstrated in the preferred embodiment 10, and as shown in FIGS. 1–5.

Figure 10:
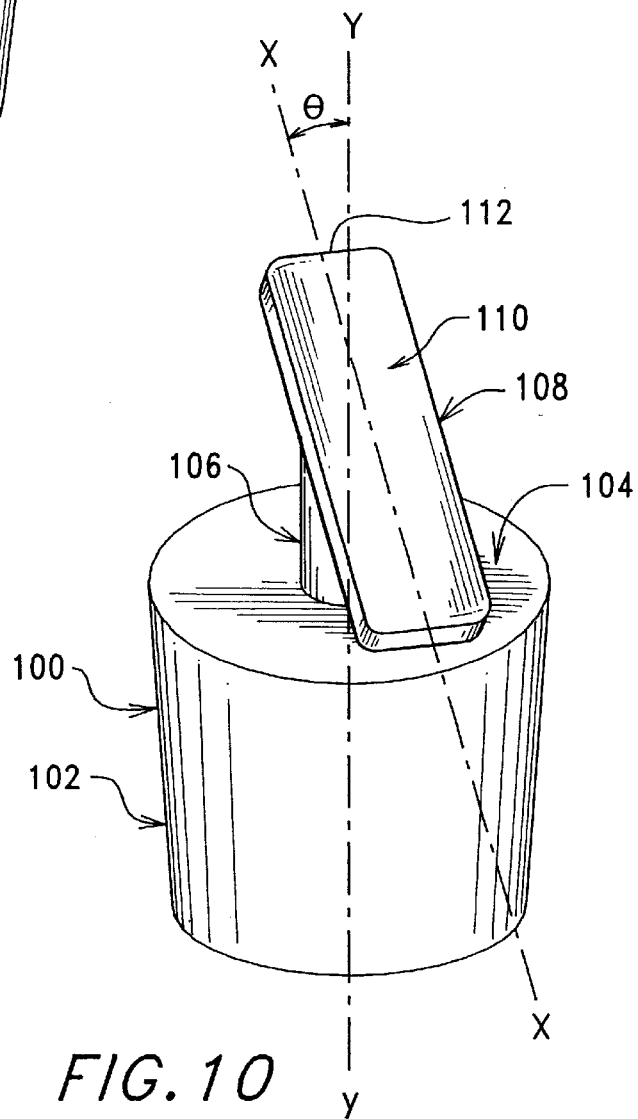
FIG. 10 is an isometric view of an alternate embodiment of the portable telephone holder of the present invention in which the shelf for supporting the portable telephone is supported by a stem that extends vertically from the center of the base.

A further embodiment 100 of the portable telephone holder of the present invention, shown in FIG. 10, has a slightly frusto-conical shaped base 102 having a peripheral side surface 103 and panel 104. A stem 106 extends vertically from the center of the top panel 104 to support an elongated shelf 108, which has a top surface 110 and a horizontal upper edge 112. The shelf 108 is positioned at a slant such that a line X—X which bisects the surface 110 of shelf 108 forms an angle θ with line Y—Y drawn along the axis of stem 106, where θ is preferably, but not necessarily, between 30° and 60°. The shelf 108 supports the portable telephone T (not shown in FIG. 10) which can be attached to shelf 108 preferably by belt clip C (not shown) or by using other attachment structures such as hook-and-loop pile strips (Velcro™), straps, bands or clips, as has been previously described.

Myriad other structures can also be used to support the elongated shelf above the base without departing from this invention, the embodiments described above being but an exemplary few. Therefore, the foregoing description is considered as illustrative only of the principles of the invention. Furthermore, since numerous modifications and changes will readily occur to those skilled in the art, it is not desired to limit the invention to the exact construction and process described above. Accordingly, all suitable modifications and equivalents may be resorted to falling within the scope of the invention as defined by the claims which follow.

The embodiments of the invention in which an exclusive property or privilege is claimed are defined as follows:

1. A portable telephone holder for mounting a portable telephone in a cup holder of a vehicle that has an opening or well with a diameter that is sized to receive a conventional drinking cup with one or more cup holder surfaces at least partially surrounding the opening or well to contact and retain the cup in the well, wherein the portable telephone holder comprises:

a base with an arcuate sidewall that extends more than 180° around a longitudinal axis with a diameter that approximates the diameter of an opening or well of a cup holder such that said base is insertable into said cup holder with said cup holder surfaces in contact with said arcuate external surface of the base; and an elongated tongue extending longitudinally upwardly and radially inwardly from a portion of said arcuate sidewall, said tongue having an elongated telephone support surface facing longitudinally upwardly and radially outwardly.

2. The portable telephone holder of claim 1, wherein said elongated tongue extends through said longitudinal axis such that a portable telephone positioned on said telephone support surface is positioned over the cup holder with said longitudinal axis extending through the portable telephone.

3. The portable telephone holder of claim 2, wherein said tongue extends radially inwardly at an angle in a range of about 30° to 60°.

4. The portable telephone holder of claim 1, including a telephone stabilizer on said tongue.

5. The portable telephone holder of claim 4, wherein tongue extends from a proximal end at said base to a distal end, and said telephone stabilizer includes a concave slanted surface on said tongue intersecting said distal end.

6. The portable telephone holder of claim 5, wherein said tongue has an under side opposite said telephone support surface and said concave slanted surface is in said under side adjacent said distal end.

7. The portable telephone holder of claim 4, wherein said tongue has an under side opposite said telephone support surface and said telephone stabilizer includes a pair of ridges protruding from said under side and spaced apart a sufficient distance in relation to each other to allow positioning a belt clip on the telephone between said ridges.

8. The portable telephone holder of claim 4, including a hook and loop fastener strip on the telephone support surface.

9. The portable telephone holder of claim 1, wherein said base has a sidewall that extends less than 360° around said longitudinal axis and terminates at two ends, said sidewall being resiliently deformable under an external force that tends to move said two ends from a normal shape toward each other and having sufficient material memory to be springable back toward said normal shape when such external force is removed.

10. The portable telephone holder of claim 1, wherein said base has a sidewall that extends 360° around said longitudinal axis.

11. A portable telephone holder for mounting a portable telephone in a cup holder of a vehicle that has a opening or well with a diameter that is sized to receive a conventional drinking cup with one or more cup holder surfaces at least partially surrounding the opening or well to contact and retain the cup in the well, wherein the portable telephone holder comprises:

a base with an arcuate sidewall that extends more than 180° around a base longitudinal axis with a diameter that approximates the diameter of an opening or well of a cup holder such that said base is insertable into said cup holder with said cup holder surfaces in contact with said arcuate external surface of the base;

an elongated shelf positioned above the base with a top side comprising a telephone support surface and an under side that is opposite said top side and terminates at a distal end with a concave slanted surface; and a stem extending between said base and said shelf.

12. The portable telephone holder of claim 11, wherein said elongated shelf longitudinal axis intersects said base longitudinal axis at an angle in a range of about 30° to 60°.

13. The portable telephone holder of claim 12, wherein said elongated shelf has a length and a width, and wherein said length is at least two times as long as the width.

* * * * *